L. LEMOINE.
PRESSURE REDUCING VALVE FOR GAS.
APPLICATION FILED FEB. 2, 1914.
1,145,601.
Patented July 6, 1915.
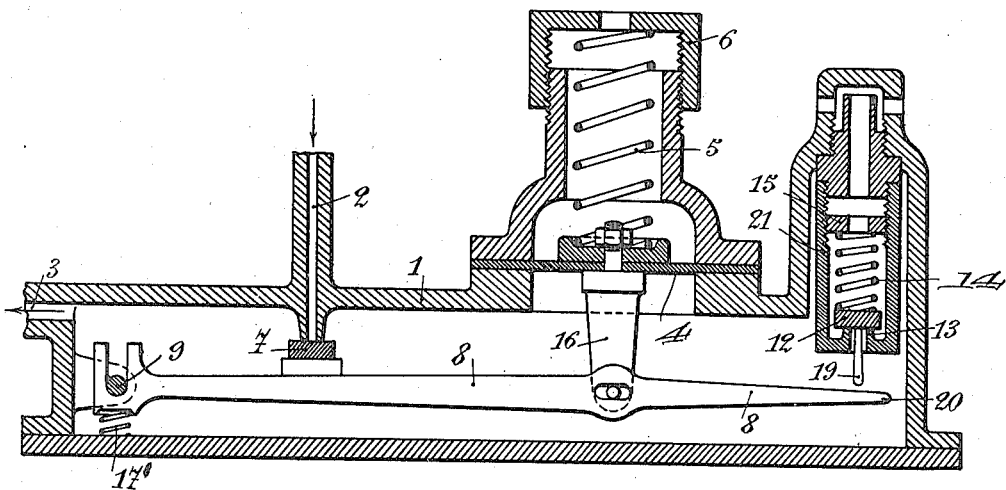

ical settings.

UNITED STATES PATENT OFFICE.

LOUIS LEMOINE, OF PARIS, FRANCE.

PRESSURE-REDUCING VALVE FOR GAS.

1,145,601.   Specification of Letters Patent.   Patented July 6, 1915.

Application filed February 2, 1914. Serial No. 816,001.

*To all whom it may concern:*

Be it known that I, LOUIS LEMOINE, citizen of the Republic of France, residing at No. 12 Rue Émile-Dubois, Paris, France, have invented new and useful Improvements in Pressure-Reducing Valves for Gas, of which the following is a specification.

In gas pressure reducing valves provided with a spring controlled flexible membrane, the movements of which are transmitted to a plug adapted to close the inlent opening, it not infrequently happens that the plug refuses to close properly. For this reason it is customary to provide the reducing valve with a so-called safety-valve, normally held pressed on its seat by a spring, the pressure of which may be regulated in the well known manner by a screw or the like. Thus, when the pressure in the valve casing rises too high, the safety valve is lifted off its seat but, while this is intended, the safety valve does not always work, either because the valve sticks or because the valve has been tampered with and is out of order.

The object of my invention is to produce a gas pressure reducing valve in which, upon a continued increase in pressure in the valve casing, the safety valve is positively forced off its seat. In order to obtain this object the member, usually a lever, which operates a plug for closing the inlet opening of the valve casing, is so arranged that, upon the seating of said plug, it can still continue its movement so as to come in contact with a projecting portion of the safety valve so that the latter is positively forced off its seat by the lever.

The drawing shows one embodiment of my invention in central longitudinal section.

1 is the valve casing, 2 the gas inlet and 3 the gas outlet. 4 is the flexible membrane and 5 the spring bearing against this membrane and adapted to be regulated as to its pressure by a nut 6. The plug for closing the gas inlet 2 is marked 7 and is operated by a lever 8, pivoted at 9. In the construction shown this lever is connected with the membrane 4 intermediate its ends by the stem 16, secured to the membrane, whereas, the connection between the free end of the said stem and the lever 8, is a pin and slot connection.

According to the construction shown, the plug 7 for closing the gas inlet 2 is fixed directly on the lever 8. At one end this lever is provided with a slot loosely embracing the pivot, and between this end of the lever and the wall of the casing 1 a spring 17' is placed. Due to this arrangement the lever 8, upon the seating of the plug 7, can continue its movement, together with the membrane 4 should the pressure in the casing much further increase. In doing so, the extreme end 20 of the lever will come in contact with a pin 19 screwed to and projecting from the safety valve 12, which is normally held to its seat 13 by a spring 14, the pressure of which spring may be regulated by a nut 15. Thus, should the pressure in the valve casing, as a result of the insufficient closing of the gas inlet 2, increase, the safety valve 12, on account of the continued movement of the lever 8, will be forcibly lifted off its seat, as the spring 17' will yield to the increased pressure, thereby allowing the extremity 20 of the lever 8 to come in contact with and bear against the projection 19 of the safety valve 12. Since the membrane 4 has a comparatively large area relative to the area of the safety valve, even a slight increase in pressure in the valve casing will suffice to cause the lever 8 to lift the safety valve 12 from its seat, the movement of the lever 8 overcoming the resistance of the spring 14 and the additional resistance due to adhesion of the valve to its seat. With this arrangement, therefore, the spring 14 bearing against the safety valve 12 can be safely adjusted to the greatest pressure at which the reducing valve is supposed to work.

In order to keep incompetent persons from access to the safety valve and changing the adjustment of its spring, the safety valve is placed in a casing 21 mounted inside instead of outside of the casing of the reducing valve.

I claim as my invention:

In a pressure reducing valve, the combination with the casing having an inlet and an outlet passage, of a membrane, a closing member for the inlet passage, an actuating lever carrying said closing member, said lever being slotted at one end to loosely embrace the pivot, and a connection between the said membrane and the other end of said lever, a safety valve having a projection in the path of said lever so as to be engaged thereby during the continued movement of said lever after the seating of the closing member and a spring inserted between the pivoted end of said lever and a wall of said casing.

In testimony whereof I have signed my name to this specification in the presence of two subscribing witnesses.

LOUIS LEMOINE.

Witnesses:
    LOUIS FANTEAT,
    HANSON C. COXE.